March 14, 1961     L. ISACHSEN     2,974,978
STEERING MECHANISM FOR STEERING OF THE WHEELS OF
A TRAILER COUPLED TO A TRACTOR VEHICLE
Filed Oct. 8, 1958     2 Sheets-Sheet 1

INVENTOR
LUDVIK ISACHSEN
BY
ATTORNEYS

March 14, 1961 L. ISACHSEN 2,974,978
STEERING MECHANISM FOR STEERING OF THE WHEELS OF
A TRAILER COUPLED TO A TRACTOR VEHICLE
Filed Oct. 8, 1958 2 Sheets-Sheet 2
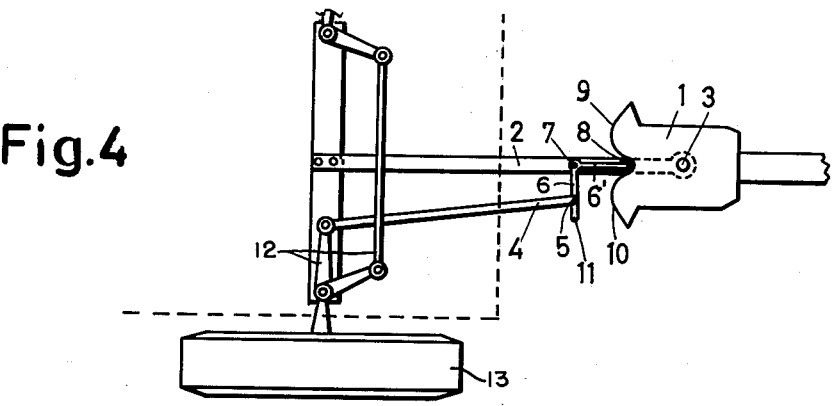
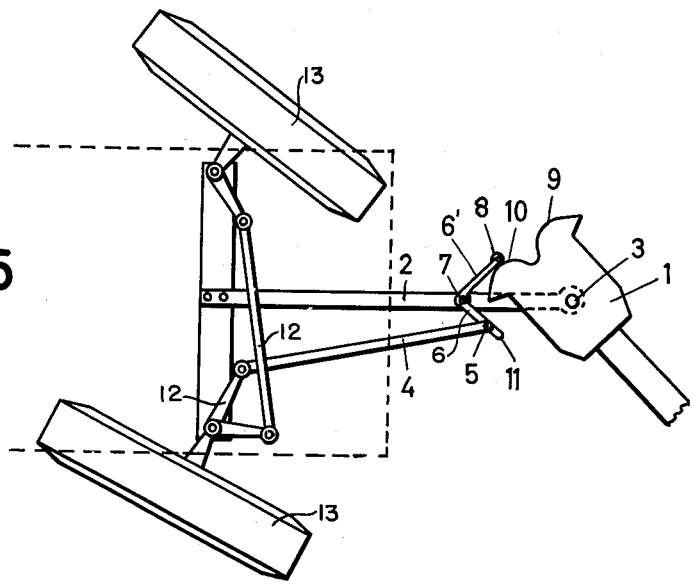
INVENTOR
LUDVIK ISACHSEN

United States Patent Office 2,974,978
Patented Mar. 14, 1961

2,974,978

STEERING MECHANISM FOR STEERING OF THE WHEELS OF A TRAILER COUPLED TO A TRACTOR VEHICLE

Ludvik Isachsen, Skiringsalsgate 21, Larvik, Norway

Filed Oct. 8, 1958, Ser. No. 766,077

Claims priority, application Norway Nov. 8, 1957

5 Claims. (Cl. 280—444)

It has previously been proposed to steer the wheels of a trailer drawn by for example a tractor or a truck and this steering is automatic so that the trailer as far as possible will follow the track of the tractor vehicle around curves.

Previously known mechanisms for such steering of the trailer are provided with a link connection between the tractor vehicle and the trailer and this link connection will then steer at least the front wheels of the trailer according to the angular position of the trailer relative to the tractor vehicle.

The angular position of the trailer in relation to the tractor vehicle will then be limited by the permissible steering motion for the wheels of the trailer and all ordinary trips with trailer will involve motions which will be well inside this limitation.

In many cases, however, the manoeuvring of a tractor vehicle with trailer having steerable wheels will result in such a position of the trailer in relation to the tractor vehicle, that the angle between them has to be smaller than the angle the steering mechanism will permit and this will result in that the trailer with the steerable wheels in one end position will swing further laterally in relation to the tractor vehicle, whereby the steering mechanism between the vehicle and the trailer will be further acted upon, while the wheels of the trailer are unable to move further and this will damage and fracture the steering mechanism or bring same out of adjustment.

The invention has for its object to eliminate this disadvantage by providing an improvement, which enables the trailer to swing without restrictions in relation to the tractor vehicle, without adversely affecting the steering mechanisms for the wheels of the trailer.

This is in accordance with the invention achieved by rendering the steering mechanism inactive when the lateral swinging motion of the trailer in relation to the tractor vehicle is abnormally large.

The invention thus relates to an improvement in steering mechanisms for steering the wheels of a trailer coupled to a tractor vehicle, the steering being effected by means of link connection between the trailer and the tractor vehicle, so that the position of the wheels of the trailer will be in accord with the lateral angular position of the trailer in relation to the tractor vehicle during ordinary operation, and the invention further consists in that an arm, which is adapted to steer the wheels of the trailer from one end position to the other end position is controlled by the steering mechanism in such a manner, that the wheels of the trailer are not acted upon when the trailer swings more than normally laterally in relation to the tractor vehicle.

In a preferred embodiment the steering mechanism comprises two cams for turning right and left respectively, said cams having such a shape that the arm cooperating with the cams during ordinary driving will be displaced to steer the wheels of the trailer, while the arm under abnormal angular position of the trailer in relation to the tractor vehicle will follow the contour of the cam without acting further on the steering linkage for the wheels of the trailer.

Instead of cams suitably shaped cam grooves may be used for controlling said arm.

The invention will in the following be described in detail with reference to the drawings in which the views are broken plan views and:

Figure 1:
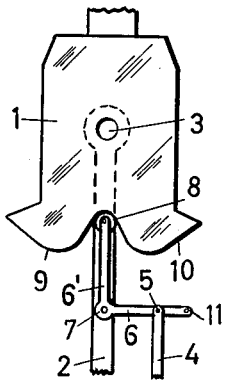
Fig. 1 shows a steering mechanism designed in accordance with the invention.
Figure 3:
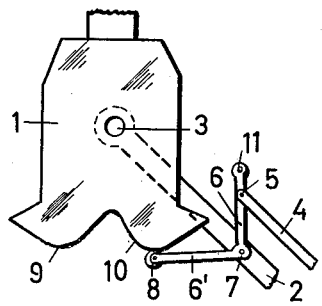
Fig. 3 shows the mechanism of Figs. 1 and 2 in the position of an abnormal relation between the trailer and the tractor vehicle.

Fig. 4 shows the steerable front wheels of a trailer and the steering linkage therefor together with the mechanism shown in Fig. 1, in the position shown in Fig. 1, and connected to the trailer and its steering linkage, and Fig. 5 is a view of the elements shown in Fig. 4 showing the steering mechanism in the position illustrated in Fig. 3 with the front wheels of the trailer turned correspondingly.

In the diagrammatic example illustrated in the drawings, a main coupling member 1 is secured to the rear end of a tractor vehicle, not shown. The trailer, the steerable wheels and steering linkage of which are shown in Figs. 4 and 5, is connected to the main member 1 by a draw bar 2. The forward end of the draw bar 2 is pivotally connected to the main member 1 by means of a bolt, a ball joint or similar connection 3. A steering rod 4 is connected to the steering linkage 12 of the front wheels 13 of the trailer in the manner shown in Figs. 4 and 5, for the steering of these wheels, and this steering rod 4 is pivoted at 5 to an arm 6 of a bell crank having the arms 6 and 6', the bell crank being pivoted to the draw bar 2 at 7. The free end of the arm 6' is provided with a cam follower roller 8, which in the example illustrated, rolls on and is controlled by two similar oppositely contoured cams 9 and 10, provided on the main member 1, for left and right turning respectively of the trailer laterally. Figs. 1 and 4 show the position of the elements of the steering mechanism when the trailer is straight behind the tractor vehicle.

Figure 2:
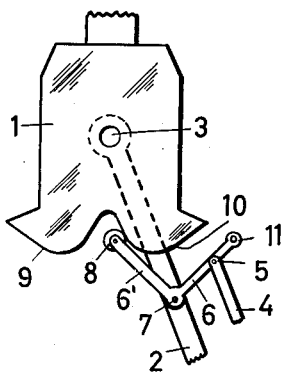
Fig. 2 shows the same mechanism with the trailer swung laterally in relation to the tractor vehicle in an ordinary way.

When the trailer swings in relation to the tractor vehicle, the draw bar 2 will, of course, move to one side, for example to the right, as shown on Fig. 2, and the roller 8 will then follow the cam 10 so that the arm 6 will pivot about the point 7 and will pull the steering rod 4 forwardly in relation to the trailer, whereby at least the front wheels 13 of the trailer will swing to correct position, so that the trailer will follow a predetermined track.

The movement of the arm 6 will be large or small according to the extent of the angular motion of the trailer in relation to the tractor vehicle, and if the draw bar 2 in Fig. 2 swings to the left on the drawing, the movement of the arm 6 will be opposite the movement shown and will result in an opposite movement of the steerable wheels of the trailer.

The action performed by the steering mechanism described above does not depart from the action achieved in commonly known steering mechanisms consisting of suitably designed link connections and the like.

When, however, the laterally angular position of the trailer relative to the tractor vehicle has become so small that the wheels on the trailer have been moved to an end position, and are unable to move further, the roller 8 (Figs. 3 and 5) will have reached the top or maximum of the cam 10, and due to the resulting motion of the arm 6, the steering rod 4 will have moved the wheels 13 of the trailer to an end position. If now the vehicle has to back up or due to difficult conditions has to manoeuvre in such a manner that the lateral angular position of the tractor vehicle in relation to the trailer is further decreased, i.e. moved in such a manner that the draw bar 2 will swing counter clock-wise on Figs. 3 and 5, the wheels on the trailer will skid on the ground or the road but this skidding does not do any harm and the roller 8 will further follow the cam 10 without moving the arm 6 in relation to the draw bar 2. The steering mechanism 12 and the steering rod 4 will then be maintained in an end position and will not be forced passed this end position, as the case is in known steering mechanisms.

A tractor vehicle with trailer may therefore be manoeuvred without restrictions and in the manner which is best suited to the prevailing conditions in each case without it being necessary to pay any attention to the limits of the steering mechanism for the trailer.

The extent of motion of the steering rod 4 will have to be adjusted to the dimension of the tractor vehicle and the trailer and to adjust the extent of this motion in a simple manner the arm 6 is, in the example shown, provided with at least one further bore 11 in which the steering rod 4 may be attached if found advantageous.

The example shown will merely serve to illustrate the invention, which, is not to be regarded as restricted to the scope of the example, since all details which are not required for the understanding of the invention are omitted. For instance, it may very well be possible that the free end of the arm 6' is guided by a groove having approximately the same shape as the cams 9 and 10, since the arm 6' and the roller 8 otherwise perhaps would hammer against the cam 10 (Fig. 2), when the wheels of the trailer are passing over uneven ground or similar hindrances. Such hammering will result in repeated shocks in the steering rod 4.

I claim:

1. In a steering mechanism for steering the steerable wheels of a trailer drawn by a tractor vehicle in which the steerable wheels of the trailer are provided with a steering linkage, the tractor vehicle is provided with a coupling member and the trailer is connected to the tractor vehicle by a draw bar pivoted to the coupling member, the improvement comprising a bell crank pivoted to the draw bar one arm of which extends laterally to one side of the draw bar, a steering rod connecting said arm with the steering linkage of the steerable wheels of the trailer, and cam means on the coupling member, the free end of the other arm of the bell crank extending from the pivot of the bell crank on the draw bar toward and engaging the cam means, the cam means having a contour for controlling the rocking of the bell crank to turn the steerable wheels of the trailer to follow a predetermined turning path as the tractor vehicle is turned and the angle of the draw bar is changed with respect to the vehicle.

2. A steering mechanism as claimed in claim 1, in which the contour of the cam means on its respective sides is similar for right and left turning, each side being shaped to rock the bell crank only until the steerable wheels of the trailer are turned to their normal limit.

3. A steering mechanism as claimed in claim 2, in which each side of the contour of the cam means curves outwardly and rearwardly from its center and then slopes outwardly and forwardly.

4. A steering mechanism as claimed in claim 1, in which the contour of the cam means is located between the pivot point of the draw bar and the pivot point of the bell crank and includes contour portions for respectively controlling right and left turning of the steerable wheels of the trailer.

5. In a steering mechanism for steering the steerable wheels of a trailer drawn by a tractor vehicle in which the steerable wheels of the trailer are provided with a steering linkage, the tractor vehicle is provided with a coupling member and the trailer is connected to the tractor vehicle by a draw bar pivoted to the coupling member, the improvement comprising a bell crank pivoted to the draw bar one arm of which extends laterally to one side of the draw bar, a steering rod connecting said arm with the steering linkage of the steerable wheels of the trailer, the free end of the other arm of the bell crank extending from the pivot of the bell crank on the draw bar toward the coupling member, and means on the coupling member cooperating with the free end of said other arm and the movement of the draw bar for controlling the rocking of the bell crank to turn the steerable wheels of the trailer to follow a predetermined turning path as the tractor vehicle is turned and the angle of the draw bar is changed with respect to the vehicle.

References Cited in the file of this patent

UNITED STATES PATENTS

| 2,559,487 | Whitlow | July 3, 1951 |

FOREIGN PATENTS

| 255,962 | Germany | Jan. 25, 1913 |
| 444,321 | Great Britain | Mar. 18, 1936 |